(12) United States Patent
Munshi et al.

(10) Patent No.: US 12,709,663 B2
(45) Date of Patent: Aug. 18, 2026

(54) PROCESS FOR THE PREPARATION OF AN ORGANO-POLYSULFIDE

(71) Applicant: RELIANCE INDUSTRIES LIMITED, Mumbai (IN)

(72) Inventors: Pradip Munshi, Vadodara (IN); Santosh Agrawal, Indore (IN); Ninad Deepak Ingle, Pune (IN); Sumeet Sharma, Dombivali (IN); Padmavathi Garimella, Visakhapatnam (IN); Raksh Vir Jasra, Vadodara (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 530 days.

(21) Appl. No.: 17/927,170

(22) PCT Filed: May 28, 2021

(86) PCT No.: PCT/IB2021/054684
§ 371 (c)(1),
(2) Date: Nov. 22, 2022

(87) PCT Pub. No.: WO2021/240453
PCT Pub. Date: Dec. 2, 2021

(65) Prior Publication Data

US 2023/0227610 A1 Jul. 20, 2023

(30) Foreign Application Priority Data

May 29, 2020 (IN) ............................ 202021022612

(51) Int. Cl.
*C08G 75/16* (2006.01)

(52) U.S. Cl.
CPC .................................... *C08G 75/16* (2013.01)

(58) Field of Classification Search
CPC .......... C08G 75/16; C08L 81/04; C08L 63/00
See application file for complete search history.

(56) References Cited

U.S. PATENT DOCUMENTS

| | | | | |
|---|---|---|---|---|
| 2,272,265 A * | 2/1942 | Frost | C08G 75/16 525/535 |
| 4,025,495 A * | 5/1977 | Peerts | C08G 75/16 427/388.1 |
| 5,432,257 A * | 7/1995 | Lee | C08G 75/02 528/381 |
| 2004/0122277 A1 | 6/2004 | Heller et al. | |

FOREIGN PATENT DOCUMENTS

EP 2103669 A2 9/2009

OTHER PUBLICATIONS

ISR for International Application PCT/IB2021/054684 mailed Sep. 9, 2021.
Written Opinion for International Application PCT/IB2021/054684 mailed Sep. 9, 2021.

(Continued)

*Primary Examiner* — Shane Fang
(74) *Attorney, Agent, or Firm* — LADAS & PARRY LLP

(57) ABSTRACT

The present disclosure relates to a process for the preparation of an organo-polysulfide from a chlorinated hydrocarbon and an elemental sulfur waste. The organo-polysulfide of the present disclosure has a coke inhibition ability.

3 Claims, 3 Drawing Sheets

(56) References Cited

OTHER PUBLICATIONS

Karunarathna, M. S., Lauer, M. K., Tennyson, A. G., & Smith, R. C. (2020) Copolymerization of an aryl halide and elemental sulfur as a route to high sulfur content materials. Polymer Chemistry, 11(9), 1621-1628. Published on Jan. 22, 2020 (Jan. 22, 2020) (abstract, introduction, scheme IB, scheme 2, results and discussion, figures, tables, synthesis of XS81, conclusions).
Lundquist, Gibson, C. N. A., Worthington, M. J., Adamson, T., Johnston, M. R., Ellis, A. V., & Chalker, J. M. (2018) Polysulfides made from re-purposed waste are sustainable materials for removing iron from water. RSC advances, 8(3), 1232-1236. Published on Jan. 3, 2018 (Mar. 1, 2018) (abstract, p. 1232: col. 2, p. 1233: col. 1, pp. 1234-1235, figures).
Zhang, Y., Glass, R. S., Char, K., & Pyun, J. (2019) Recent advances in the polymerization of elemental sulphur, Inverse vulcanization and methods to obtain functional Chalcogenide Hybrid Inorganic/Organic Polymers (CHIPs) Polymer Chemistry, 10(30), 4078-4105. Published on Jun. 20, 2019 (Jun. 20, 2019) (abstract, Sections: 1, 2.2, 2.2.1, 3-4, figures, reaction schemes).

* cited by examiner

PROCESS FOR THE PREPARATION OF AN ORGANO-POLYSULFIDE

RELATED APPLICATION

This application is an application under 35 U.S.C. 371 of International Application No. PCT/IB2021/054684 filed on 28 May 2021, which claims priority from Indian Application No. 202021022612 filed 29 May 2020 the disclosures of which are incorporated in their entirety by reference herein.

FIELD

The present disclosure relates to a process for the preparation of an organo-polysulfide.

Definitions

As used in the present disclosure, the following terms are generally intended to have the meaning as set forth below, except to the extent that the context in which they are used indicates otherwise.

Polysulfide: Polysulfides are a class of chemical compounds containing a chain of sulfur atoms.

Organo-polysulfide: Organo-polysulfide is a chemical compound where apart from the chain of sulfur atoms, alkyl or aryl group is also present. Organo-polysulfides have a general formula RSR, wherein R is an alkyl or aryl group, S is sulfur, and n represents the number of sulfur atoms present between carbon atoms.

Coke: Petroleum coke, abbreviated as pet coke or coke, is the carbon rich solid material that is co-produced during refining or hydrocracking of crude oils.

FCC: Fluid catalytic cracking (FCC) is a process used in a refinery for converting high boiling and high molecular weight hydrocarbon fraction into valuable gasoline and other products.

BACKGROUND

The background information herein below relates to the present disclosure but is not necessarily prior art.

Organosulfide compounds or organodisulfide compounds are known to act as sulfiding agents that can inhibit the formation of coke during hydrocarbon cracking. Organosulfide compounds are prepared by:

reacting hydrogen sulfide compounds with halogenated hydrocarbon in the presence of a base or alkali, wherein R is an alkyl group (equation 1).

(1)

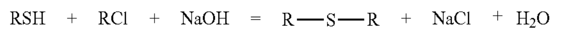

heating elemental sulfur under aqueous alkali followed by reacting with alkali halide to form alkali disulfide (equations 2 and 3).

(2)

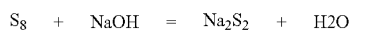

(3)

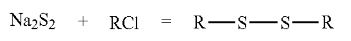

reacting alkali disulfide with alkyl dihalide to form alkali polysulfide (equation 4).

(4)

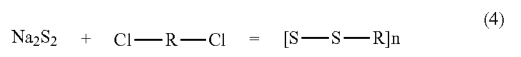

Further, the reaction of organic disulfide with elemental sulfur and with other alkali sulfides in the presence of a base or alkali catalyst produces organic polysulfide (equation 5).

(5)

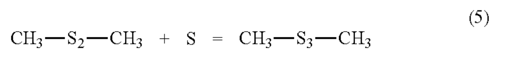

The reaction between elemental sulfur and olefinic hydrocarbons is known to form highly cross-linked polysulfide at a temperature of 185° C. The effect of the catalyst feedstock and operating conditions on the composition and octane number of FCC gasoline reports strict exclusion of sodium, which is the primary need in naphtha cracking as it has a negative influence in coke formation.

Therefore, there is felt a need to develop an organo-polysulfide that mitigates the drawbacks mentioned herein above.

Objects

Some of the objects of the present disclosure, which at least one embodiment herein satisfies, are as follows:

An object of the present disclosure is to ameliorate one or more problems of the prior art or to at least provide a useful alternative.

Another object of the present disclosure is to provide a process for the preparation of an organo-polysulfide.

Yet another object of the present disclosure is to provide a simple and economical process for preparation of organo-polysulfide.

Still another object of the present disclosure is to provide a process for preparing an organo-polysulfide by using refinery waste or waste of chemical industries.

Yet another object of the present disclosure is to provide an organo-polysulfide capable of inhibition of coke deposition during hydrocarbon cracking.

Other objects and advantages of the present disclosure will be more apparent from the following description, which is not intended to limit the scope of the present disclosure.

SUMMARY

The present disclosure relates to a process for the preparation of an organo-polysulfide. The process comprises mixing at least one chlorinated hydrocarbon and elemental sulfur mixed in a pre-determined ratio to obtain a mixture. The mixture is heated at a first predetermined temperature for a time period in the range of 3-6 hours to obtain a heated solid mass. The heated solid mass is cooled to obtain a cooled mass. The cooled mass is washed with a fluid medium to obtain a wet mass. The wet mass is dried at a second predetermined temperature to obtain organo-polysulfide.

The organo-polysulfide has a structural formula R—C—S—S—C—R and is characterized by having a sulfur content of more than 40 wt. % of the total weight of organo-polysulfide, a carbon content of less than 25 wt. % of the total weight of organo-polysulfide and a hydrogen content of less than 5 wt. % of the total weight of the organo-polysulfide, wherein R in the organo-polysulfide is independently selected from at least one alkyl and aryl group

BRIEF DESCRIPTION OF THE ACCOMPANYING DRAWINGS

The process for preparation of an organo-polysulfide will now be described with reference to the accompanying, non-limiting drawings, in which.

DETAILED DESCRIPTION

Figure 1:
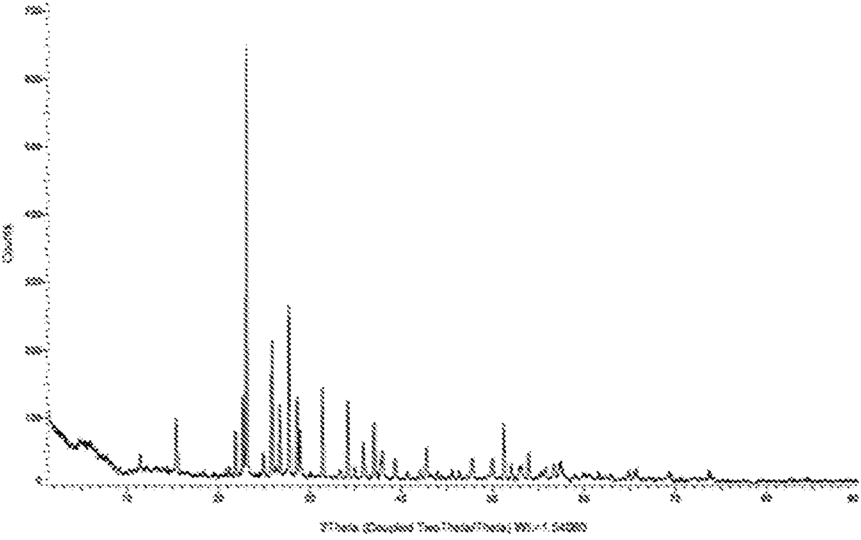
FIG. 1 illustrates X ray diffraction of the elemental sulfur obtained from refinery.

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

One of the major wastes of chemical industry includes chlorinated hydrocarbons. The waste i.e., chlorinated hydrocarbons is generated as a by-product during the manufacture of chlorinated solvents or monomers like ethylene dichloride, vinyl chloride monomer, methyl chloroform, trichloroethylene, epichlorohydrin, perchloroethylene, allyl chloride monomer and dichloro benzene. The products manufactured are used as organic solvents or as raw materials for making polymers, plastic films, non-ozone depleting refrigerants, all essentially important in our life. However, the by-product/waste such as chlorinated hydrocarbon wastes are known to be toxic to humans and its disposal is a major challenge.

Conventionally, the disposal of chlorinated hydrocarbon is done by extracting separable components from chlorinated hydrocarbon waste by distillation for further use. However, setting up a distillation plant for extraction of useful components from chlorinated waste implies a large capital investment and secondly the process of extraction is quite cumbersome. Therefore, the process of extraction is not a viable alternative. It is difficult to use the waste i.e., chlorinated hydrocarbon for any other purpose and therefore, incineration is a preferred way of disposal. However, there are lot of restrictions on the incineration process itself due to environmental concerns. Secondly, carbon-chloride bond in the chlorinated hydrocarbon is very strong and gives strong stability to these chemicals. They therefore, tend to stay long in the environment. In view of this, the chlorinated hydrocarbon waste is hazardous to the environment.

Further, sulfur compounds are known in prior art for use as coke inhibitors. However, these sulphur compounds are prepared using sodium or other catalysts which renders the coke inhibition process inefficient. Still further a typical crude oil refinery separates different fractions of crude oil. The crude oils also contain sulfur compounds which are harmful for different fractions and therefore, need to be removed. Most of the refineries separate sulfur waste in the form of elemental sulfur. Though elemental sulfur finds use in some chemical industries, supply of elemental sulfur exceeds demand and therefore, there is a need to find additional alternate use of elemental sulfur waste obtained from a refinery. In view of this, excess sulfur needs to be utilized in a proper way.

The present disclosure solves the problem of handling these wastes and provides a process for preparing an organo-polysulfide by using waste of chlorinated hydrocarbon and elemental sulfur.

Further, conventionally the reaction of organic disulfide with elemental sulfur and other alkali sulfide in the presence of a base or alkali catalyst gives organic polysulfide (equation 5).

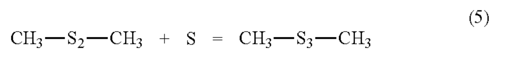

(5)

However, the reaction between elemental sulfur and olefinic hydrocarbons is known to form a highly crosslinked polysulfide at a temperature of 185° C. The effect of the catalyst feedstock and operating conditions on the composition and octane number of FCC gasoline reports strict exclusion of sodium, which is the primary need in naphtha cracking as it has a negative influence in coke formation.

The present disclosure solves the problem by providing a process for the preparation of an organo-polysulfide without using sodium or any other catalyst.

In an aspect, the present disclosure provides a process for preparation of an organo-polysulfide from the waste of chemical industry.

The process comprises mixing at least one chlorinated hydrocarbon and elemental sulfur in a pre-determined ratio under stirring to obtain a mixture.

The chlorinated hydrocarbon is at least one selected from a group consisting of ethylene chloride, trichloroethane, polyvinyl chloride, polyvinylidene chloride, halobutyl rubber and ethylene chloro trifluoro ethylene polymer. In an embodiment of the present disclosure, chlorinated waste is chosen from a vinyl chloride plant used for making polymeric material. In an exemplary embodiment of the present disclosure, chlorinated waste comprises a combination of 1,2 ethylene chloride and 1,1,2 trichloroethane.

The weight ratio of the chlorinated hydrocarbon and the elemental sulfur is in the range of 20:1 to 2:1. In an embodiment of the present disclosure, the weight ratio of chlorinated hydrocarbon waste to elemental sulfur is 4:1.

FIG. 1 illustrates X-ray diffraction of elemental sulfur wherein sharp peaks characterize elemental sulfur.

Figure 2:
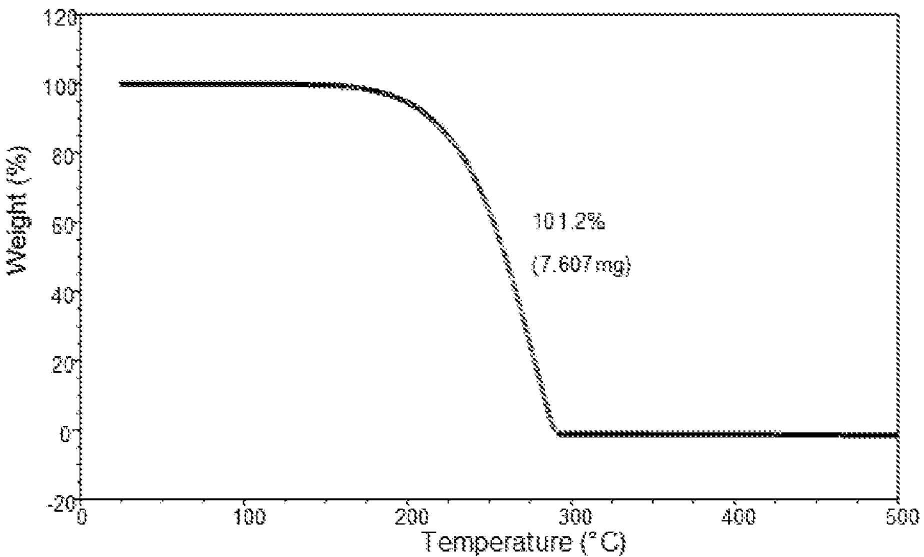
FIG. 2 illustrates thermo-gravimetric analysis of the elemental sulfur.

FIG. 2 illustrates a thermo-gravimetric graph of elemental sulfur wherein loss of volatile matter is observed only after temperature exceeds 175° C.

The so obtained mixture of the chlorinated hydrocarbon and the elemental sulfur is heated at a first pre-determined temperature for a time period 3-6 hours to obtain a heated solid mass. In accordance with the present disclosure, the first predetermined temperature is in the range of range of 170-250° C. In an exemplary embodiment of the present disclosure, the first predetermined temperature is 200° C.

The so obtained heated solid mass is cooled, to obtain a cooled mass. In an embodiment, the solid mass is cooled by depressurizing the hydrochloric acid gas.

In accordance with the present disclosure, the cooled mass is washed with a fluid medium to obtain a wet mass which is then dried at a second pre-determined temperature to obtain the organo-polysulfide.

In an embodiment of the present disclosure, the fluid medium is at least one selected from dichloromethane, chloroform, carbon tetrachloride, ethylene dichloride, chlorobutane and water. In an embodiment of the present disclosure, the solid mass is washed first with dichloromethane and then by using water to obtain the wet mass.

In accordance with the present disclosure, the second predetermined temperature is in the range of 100 to 130° C. In an exemplary embodiment, the second predetermined temperature is 110° C.

An organo-polysulfide has a structural formula R—C—S—S—C—R and is characterized by having sulfur content of more than 40 wt % of the total weight of the organo-polysulfide, carbon content of less than 25 wt % and a hydrogen content of less than 5 wt % of the total weight of the organo-polysulfide, wherein R in the organo-polysulfide is independently selected from at least one of alkyl and aryl group.

In an exemplary embodiment the Organosulfide is characterized by having sulfur content 46.75%, carbon content 21.71%, and hydrogen content 2.7%.

Figure 3:
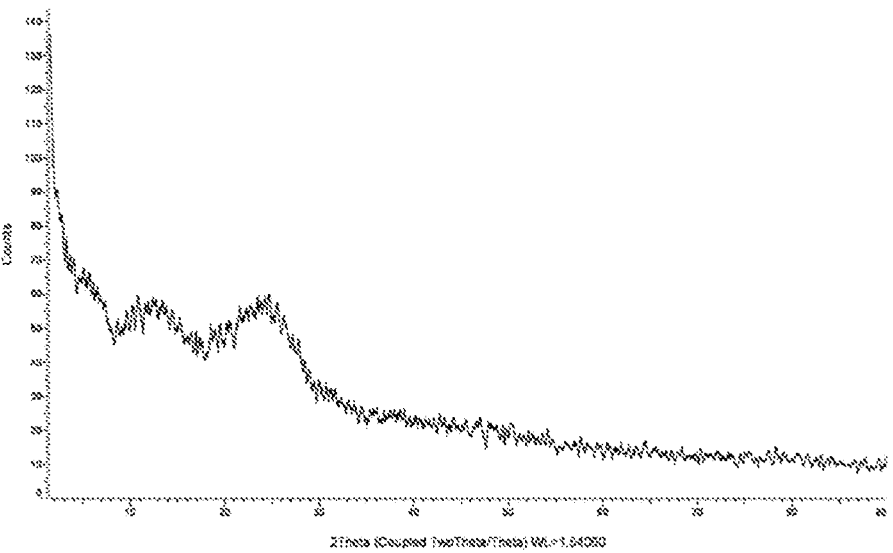
FIG. 3 illustrates X-ray diffraction of the organo-polysulfide.

FIG. 3 illustrates X-ray diffraction of the organo-polysulfide. Characteristic sharp peaks of elemental sulfur as observed in FIG. 1 are not observed in FIG. 3, indicating that elemental sulfur has reacted with chlorinated hydrocarbon.

Figure 4:
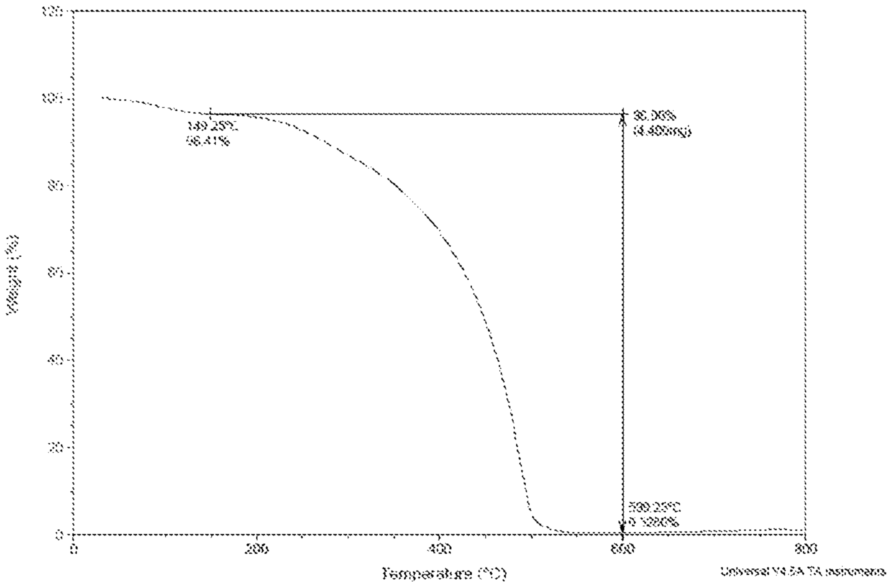
FIG. 4 illustrates thermo-gravimetric analysis of the organo-polysulfide.

FIG. 4 illustrates TGA of the polysulfide. The figure indicates that the polysulfide is stable up to 149° C. and the loss of volatile matter up to the temperature of 149° C. is 3.59 wt. %.

Figure 5:
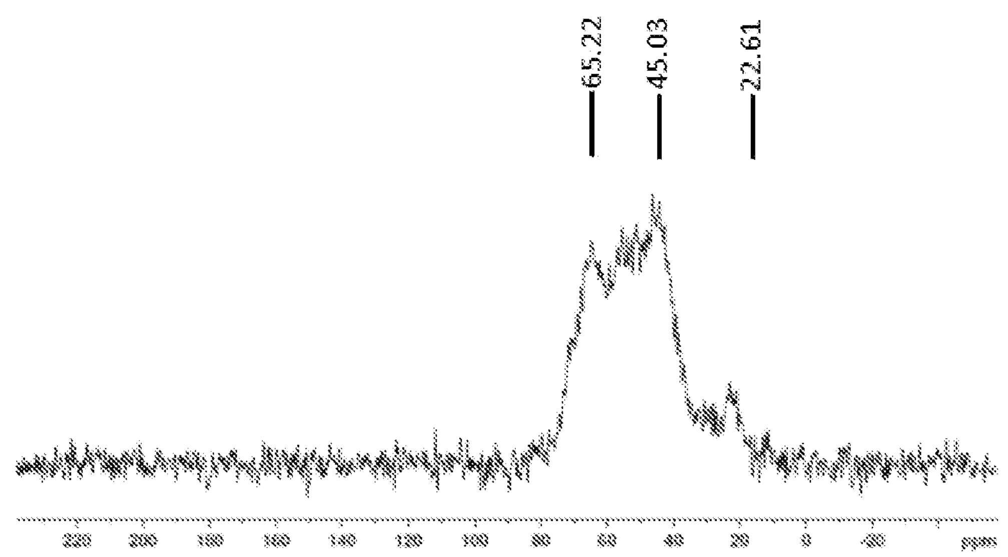
FIG. 5: illustrates $^{13}C$ MASS NMR spectra of the organo-polysulfide.

FIG. 5 illustrates $^{13}C$ NMR spectra showing peaks at 65.22, 45.03, and 22.61, chemical shift in ppm representing C—S bond particularly C—S—S bond, C (SS)—SS bond that is a secondary carbon and —CH2-respectively.

It is known in prior art, that cracking of hydrocarbons leads to the formation of by-products of coke which gets deposited on the inner surface of the tubes used for hydrocarbon cracking.

Coke deposits lead to inefficiency of heat transfer, as the thickness of the coke deposit increases, the diameter of the cracking tubes decreases. Conventionally, the deposits are removed by flushing tubes with steam and air which converts coke deposits into carbon dioxide. This process needs to be carried out at high temperature. If the deposit takes place in the heat exchanger, flushing at high temperature is not possible and therefore, dismantling of the heat exchanger and manual de-coking is necessary. Manual decoking is cumbersome and leads to long shut down time of the plant.

Coke deposit inhibitors are also typically used for inhibiting coke deposition during hydrocarbon cracking. Conventionally, the use of silicon and sulfur compounds for inhibition of coke during hydrocarbon cracking is disclosed. Further, the reaction of elemental sulfur and alkali halide in the presence of an alkali, like sodium hydroxide, forms alkali di-sulphide and organic polysulfide; however, some amount of sodium remains in the final product, which is not desirable for preventing coke deposition.

In view of the aforestated problem, the organo-polysulfide of the present disclosure is effective as a coke deposition inhibitor and solves the problem associated with the prior art. Moreover, the process of the present disclosure is economical and environment friendly as the process uses chlorinated hydrocarbon and elemental sulfur from the waste obtained from chemical plant and/or refineries.

In an embodiment of the present disclosure, 325 ppm (w) of organo-polysulfide significantly inhibited coke deposition during steam cracking of naphtha at a temperature of 800° C. It is observed that <400 ppm (w) of oragno-polysulphide added during steam cracking of naphtha, resulted in coke deposit of only 1.47 gm. after 12 hours of hydrocracking of naphtha. In another embodiment, a comparison was drawn with inhibition of coke deposition with a typical sulfur compound, dimethyl sulphide, known in the prior art for inhibition of coke deposition, under similar conditions. Coke inhibition in case of dimethyl sulphide was very poor.

The present disclosure provides an efficient coke inhibitor in the form of an organo-polysulfide prepared from chlorinated hydrocarbons and elemental sulfur, which is obtained as a waste from chemical plant and/or refineries.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Experiment 1: Preparation of Organo-Polysulfide

Chlorinated waste was collected from a vinyl chloride plant. Density of waste was measured as 1.31 gm./cc. The waste contained 15 wt. % 1,2 ethylene dichloride, 24 wt. %, 1,1,2 trichloro ethane.

Sulfur was taken from refinery waste and elemental sulfur was confirmed by X-ray diffraction studies.

25 gm. of chlorinated hydrocarbon waste and 6 gm. of elemental sulfur were introduced into an autoclave lined with non-corrosive surface, teflon.

Temperature was gradually increased to 200° C. and maintained for a period of 4 hours. Pressure was increased to 740 psi when the temperature reached 200° C.

The vessel was cooled and depressurized. Released gas was characterized as hydrochloric acid. Solid brown black mass obtained was washed with dichloromethane and water and dried at 110° C. for 3 hours to obtain organo polysulfide. The yield of organo-polysulfide was 10 gm.

Experiment 2: Coke Inhibition Study 0.675 gm. of organo-polysulfide obtained in experiment 1 was dissolved in 500 ml of cyclohexane. The solution was mixed with 4.5 liters of naphtha and heated at 800° C. under a stream of steam. After a period of 12 hours, the deposited coke in the autoclave was collected and the weight of deposited coke was found to be 1.47 gm.

Experiment 3: Coke Inhibition Study, Comparative Example 0.662 gm. (150 ppm) of dimethyl sulphide was dissolved in 0.3 liters of cyclohexane and 2.7 liters of naphtha. The solution was heated to 800° C. under a stream of steam for a period of 12 hours. The deposited coke in the autoclave was collected and the weight was found to be 5.5 gm.

Experiment 4: Elemental Analysis of Organo-Polysulfide

Elemental analysis of organo-polysulfide prepared in experiment 1 was carried out with Perkin Elmer 2400 series II and following composition in wt. % was recorded:

| | |
|---|---|
| Carbon | 21.71% |
| Sulfur | 46.75% |
| Hydrogen | 2.7% |

Technical Advancements

The present disclosure described herein above has several technical advantages including, but not limited to the process of preparation of organo-polysulfide and enumerated herein under:

- Utilization of chlorinated hydrocarbon waste of chemical industry in an environmentally friendly way.
- Utilization of elemental sulfur waste of refinery.
- Preparation of sodium and catalyst free organo-polysulfide from chemical waste and refinery waste.
- Simple and economical process for preparation of an organo-polysulfide.
- Inhibiting coke deposition with organo-polysulfide in the process of hydrocracking of hydrocarbons.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for preparing an organo polysulfide of structural formula R—C—S—S—C—R wherein each R in said organo-polysulfide is independently selected from at least one alkyl and aryl group, said process comprising the following steps:

a) mixing at least one chlorinated hydrocarbon and elemental sulfur in a weight ratio in the range 20:1 to 2:1 to obtain a mixture;

b) heating said mixture at temperature in the range of 170° C.-250° C. for a time period in the range of 3-6 hours to obtain a heated solid mass;

c) cooling said heated solid mass to obtain a cooled solid mass;

d) washing said cooled solid mass with a fluid medium to obtain a wet mass; and e) drying said wet mass at a temperature in the range of 100° C.-130° C. to obtain organo-polysulfide, wherein said chlorinated hydrocarbon and said elemental sulfur are by-products obtained from a chemical plant.

2. The process as claimed in claim 1, wherein said chlorinated hydrocarbon is at least one selected from the group consisting of ethylene chloride, trichloroethane, polyvinyl chloride, polyvinylidene chloride, halobutyl rubber and ethylene chloro trifluoro ethylene polymer.

3. The process as claimed in claim 1, wherein said fluid medium is at least one selected from the group consisting of dichloromethane, chloroform, carbon tetrachloride, ethylenedichloride, chlorobutane and water.

* * * * *